United States Patent [19]

Gabriel et al.

[11] Patent Number: 5,149,237

[45] Date of Patent: Sep. 22, 1992

[54] COATED METAL FASTENER AND COATING COMPOSITION THEREFOR

[75] Inventors: William L. Gabriel, Barrington; Geronimo E. Lat, Prospect Heights; Lawrence S. Shelton, Morton Grove, all of Ill.

[73] Assignee: Illinois Tool Works Inc., Glenview, Ill.

[21] Appl. No.: 659,236

[22] Filed: Feb. 22, 1991

[51] Int. Cl.$^5$ ............................................. F16B 15/00
[52] U.S. Cl. ................................... 411/446; 411/461; 411/442; 411/903; 411/922; 427/388.1
[58] Field of Search ............... 411/82, 258, 504, 442, 411/443, 444, 446, 461, 466, 901-903, 908, 921, 922, 920; 427/388.1, 388.4, 388.5

[56] References Cited

U.S. PATENT DOCUMENTS

| | | | |
|---|---|---|---|
| 3,853,606 | 12/1974 | Parkinson | 411/903 X |
| 3,983,304 | 9/1976 | Sekhon | 411/504 |
| 4,964,774 | 10/1990 | Lat et al. | 411/446 |

Primary Examiner—Neill R. Wilson
Attorney, Agent, or Firm—Schwartz & Weinrieb

[57] ABSTRACT

A coated metal fastener and a coating composition that has particular affinity for plaster materials and the like is disclosed. The composition that is applied to the fastener contains a copolymer of styrene and maleic anhydride and a thermoplastic resin, preferably polyvinyl acetate, in an inert organic solvent. The organic solvent can be an aromatic solvent, a ketone, a chlorohydrocarbon, or a mixture thereof. The composition is applied to the fastener by conventional methods and cured thereon at about ambient temperature.

22 Claims, 1 Drawing Sheet

COATED METAL FASTENER AND COATING COMPOSITION THEREFOR

TECHNICAL FIELD OF THE INVENTION

The invention herein relates to a coating for metal fasteners. The coating protects the metal fastener and exhibits an attraction for plaster-like materials.

BACKGROUND OF THE INVENTION

Fasteners such as nails, staples, and truss plates are utilized extensively in the construction and assembly of countless articles from buildings to fences. The useful life of a fastener is critical to its suitability for a particular purpose. For example, a nail which is not corrosion-resistant is not suited for service where it will be exposed to outdoor weather conditions.

Coatings for fasteners have been developed to protect metal fasteners from adverse conditions. A suitable fastener coating must adequately adhere to the fastener. Typically, fasteners are made of carbon steel. Fasteners can also be made of aluminum or copper alloys such as bronze. A fastener may be zinc coated or chromate coated before a protective outer coating is applied. A suitable coating should therefore adhere to a variety of metals or metallic surfaces.

Coatings for fasteners impart desirable properties to the fasteners. For example, most protective coatings on metal fasteners provide corrosion resistance, but some coatings enable a fastener to be inserted with less force yet increase the force required to remove the fastener. A fastener coating with both above-described properties is disclosed in Lat et al., U.S. Pat. No. 4,964,774. The coating disclosed in the Lat et al. patent comprises a film forming, thermoplastic, predominantly aliphatic polyurethane resin, which is applied onto the fastener in an aqueous medium and then dried thereon.

In Campbell, Jr., U.S. Pat. No. 2,329,456, a metal coating composition comprising a copolymer of a vinyl halide, a vinyl ester of a lower saturated fatty acid and an aliphatic $\alpha$, $\beta$-mono-olefinic carboxylic acid that exhibits improved adhesion to smooth metal surfaces is disclosed. The adhesion of the coating composition is improved by co-polymerizing the vinyl halide and the aliphatic vinyl ester with small quantities of an unsaturated carboxylic acid.

In Parkison, U.S. Pat. No. 3,853,606, a metal fastener coating that adheres to wood is disclosed. The coating comprises about 50 to about 80 percent by weight resin solids of a rosin-like resin, which is dispersed in about 20 to 50 percent by weight of an ethylene copolymer or terpolymer containing carboxyl or esterified carboxyl groups.

Even if coated, metal fasteners frequently do not satisfactorily anchor in porous materials such as plaster due to the chemical and physical properties of porous materials. Generally, the binder polymer in the plaster must be compatible, chemically, to the fastener overcoat for good adhesion to develop on drying.

Frequently, plaster-like materials such as spackling compound are applied as a finish over sheets of plasterboard which have been fastened to building frames. If the fastener used does not exhibit some sort of affinity for the spackling compound, the spackling compound will not adhere to those portions of the fastener not embedded in the plasterboard. If the spackling compound does not adhere to the exposed portions of the fastener, the finish coating will be uneven or pocked, which is unacceptable.

Therefore, a metal fastener coating which exhibits some affinity or attraction to plaster or plaster-like materials would be highly desirable.

SUMMARY OF THE INVENTION

The present invention is directed to a coated metal fastener and a coating therefor. The coating composition reduces penetration force, increases withdrawal force, and resists chipping or tearing away the article or object into which the fastener is imbedded or otherwise anchored. The coating further protects the metal fastener from corrosion. The coating has a strong attraction to plaster and plaster-like materials, which more readily adhere to the coated fastener herein disclosed.

According to this invention, the coating is a combination of two resins. The first resin is a copolymer of an aromatic monomer, preferably styrene, and a monomer with $\alpha,\beta$ unsaturation associated with carboxyl groups or partially esterified carboxyl groups, preferably maleic anhydride. The second resin is a thermoplastic resin, preferably vinyl acetate.

The coating composition is prepared by combining about 4% to about 15%, preferably about 7.5 weight percent of the copolymer resin with about 3% to about 16%, preferably about 5 weight percent of the thermoplastic resin in an inert organic solvent or mixture of solvents. The ratio of the first resin to the second resin is about 80 to 20 to about 20 to 80 parts by weight.

The inert organic solvents can be aromatic solvents, ketones, chlorohydrocarbons, and mixtures thereof. Preferred solvents are toluene, methylethylketone, and chloroethane, 1,1,1 trichloroethane being the most preferred. The organic solvent generally comprises about 80 to 90 percent by weight of the coating composition, preferably about 87 percent by weight.

The coating composition optionally contains a dye which, if present, is in an amount of about 0.1% to about 1%, preferably about 0.2 percent by weight of the composition.

The coating composition is suited for application onto metal fasteners made preferably of carbon steel. The fastener itself may be a nail, staple, or truss plate.

The thermoplastic, polymeric coating is applied to the fastener by dipping, spraying or roller coating the fastener with the coating composition in inert organic solvent. A reservoir filled with the coating composition is provided for this purpose. The liquid coating composition is then cured and dried on the fastener by conventional means. The coating is dried upon the fastener at approximately ambient temperature. The thickness of the dried coating composition on the fastener is about 0.2 to about 2 millimeters, preferably about 0.5 to about 1.5 millimeters. The cured coating composition is sufficiently brittle that, if bridges of dried coating should form between individual fasteners, these bridges can be broken without damaging the coating on either fastener.

The thermoplastic, polymeric coating is applied by any of the above-described methods so as to coat a substantial part of the fastener, preferably the entire fastener.

DETAILED DESCRIPTION OF THE PREFERRED EMBODIMENT

Figure 1:
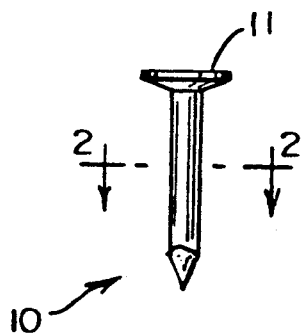
FIG. 1 is an elevational view of a nail constituting a preferred embodiment of this invention.

The present invention is directed to a coating composition for a metal fastener, a metal fastener coated with the coating composition and a method for coating the metal fastener with the coating composition. The coating composition is a combination of a copolymer and a thermoplastic resin. In particular the copolymer contains an aromatic monomer and a monomer with $\alpha,\beta$ unsaturation associated with carboxyl groups or partially esterified carboxyl groups. The copolymer and resin are combined in an inert organic solvent and applied to the metal fastener by any suitable method, preferably dipcoating.

Aromatic monomers suitable for use in the invention are styrene, vinyl toluene $p$-methylstyrene, $\alpha$-methylstyrene, divinylbenzene and the like. Styrene is preferred due to its greater availability and lower cost. Polymers made from aromatic monomers tend to be stiff and clear. Therefore, the aromatic monomer provides a degree of rigidity to the cured coating.

Aromatic monomers are commonly copolymerized with other monomers. Monomers with $\alpha,\beta$ unsaturation with carboxyl or partially esterified carboxyl groups copolymerize with aromatic monomers to form linear, strong polymers. After copolymerization, a portion of the anhydride in the resulting polymer can be partially esterified, in which case a linear aromatic polyester resin is formed.

Exemplary of monomers with $\alpha,\beta$ unsaturation with carboxyl groups are maleic anhydride, maleic acid and fumaric acid. The preferred monomer is maleic anhydride.

Styrene/maleic anhydride copolymers preferred for use in the coating composition disclosed herein are preferably unmodified copolymers of styrene and maleic anhydride monomers with mole ratios of styrene to maleic anhydride monomer of about 1 to 1 to about 3 to 1. The copolymer has a relatively high melting temperature, in the range of about 55° C. to about 170° C. and a high thermal stability. The number average molecular weight of the resin is about 1600 to about 2800. The copolymer has an acid number of about 100 to about 500. The acid number is the number of milligrams of potassium hydroxide necessary to neutralize the acid in one gram of substance.

The copolymer has a melt viscosity of about 15 cps to about 55 cps in a mixture that is about 15 percent nonvolatile material. The copolymer is soluble in a number of organic solvents. The solution viscosity and the solubility of the copolymer in the solution both increase as the ratio of styrene monomer to maleic anhydride monomer increases.

The copolymer can be either in the anhydride or partial ester form. The copolymer can be partially esterified by treating the styrene/maleic anhydride copolymer with an alcohol such as ethylene glycol. The preferred degree of esterification of the copolymer is about 35 percent to about 50 percent.

Thermoplastic synthetic resin adhesives comprise a variety of polymerized materials such as polyvinyl acetate, polyvinyl butyryl, polyvinyl alcohol, and other polyvinyl resins. Acrylic and methacrylic acid ester resins and various other synthetic resins such as polyisobutylene, polyamides, coumarone-indene products and silicones also exhibit adhesive properties desirable for the coating composition disclosed herein. The thermoplastic resins usually have permanent solubility and fusibility so that they creep under stress and soften when heated. The preferred thermoplastic resin herein is polyvinyl acetate (PVAc) which has demonstrated affinity for plaster and plaster-like compositions.

The PVAc resin used in the composition disclosed herein can be in the form of beads such as VINAC beads manufactured by Air Products and Chemicals Inc. VINAC is a registered trademark of Air Products and Chemicals, Inc. PVAc resins are typically small, glass-like beads which have a number of uses such as laminating, label and hot melt adhesives, pigmented and grease-proof paper coatings, over print varnishes, industrial lacquers and coatings, printing inks, and textile sizes and finishes. PVAc resin is resistant to attack by weak acids, alkalies and salts, but is soluble in many organic solvents. PVAc resin generally has a softening point above about 120° C. to about 165° C. Suitable PVAc resins generally have a molar viscosity of about 10 cps to about 75 cps in organic solvent. The number average molecular weight of the PVAc resin is about 90,000 to about 500,000. The resin contains no more than about 2% by weight volatile components.

The ratio of styrene/maleic anhydride copolymer to PVAc resin in the coating composition is about 20:80 to about 80:20 parts by weight. The copolymer and resin are combined in an inert organic solvent. Organic solvents suitable for this application can be an aromatic solvent, a ketone, a chlorohydrocarbon and mixtures thereof. Solvents that will evaporate quickly at room temperature are preferred. Preferred solvents are toluene, methylethylketone and chloroethane, most preferably 1,1,1 trichloroethane. The organic solvent generally constitutes about 70 to about 95 parts by weight of the coating composition, most preferably about 87 percent by weight.

The coating is then applied to the fastener by dipping, spraying, roller coating or another standard technique, such as by any of the techniques disclosed in Lat et al., U.S. Pat. No. 4,964,774, the teachings of which are incorporated herein by reference. The liquid coating composition preferably has a low viscosity so that drops of coating do not form on the fastener when it is removed from the coating bath.

The coated metal fastener is then removed from the coating bath and is dried at about ambient temperature. This is below the softening temperature of the thermoplastic resin in the coating composition. Preferably the temperature is in the range of about 60° F. (15° C.) to 100° F. (38° C). The polymer in the coating may or may not be cross-linked. The degree of cross-linking in a particular instance is dependent upon the specific composition of the resin dispersed in the solvent and the cross-linking agent, and/or accelerators that may be present. After the coated fasteners are removed from the coating bath, bridges of coating may form between individual fasteners. When dry, these bridges are brittle and break easily without damaging the coating on the fasteners to which the bridges are attached.

EXAMPLE 1

Coating Composition

A coating composition was prepared in which methylethylketone (MEK) solvent (150 lbs.), 1,1,1 trichloroethane solvent (130 lbs.) and toluene solvent (12 lbs.) were combined. A styrene/maleic anhydride copolymeric resin (35 lbs.) (2625 A Resin obtained from Atochem, Inc.) and a polyvinyl acetate resin (25 lbs.) (VINAC B-100 Resin obtained from Air Products Corp.) were uniformly dispersed in the organic solvent mixture using mechanical mixing. MEK (78 lbs.) and 1,1,1 trichloroethane (40 lbs.) were then added to the dispersed mixture along with a dye (1502) (Orazol dye from Ciba Giegy Corp.). The mixture was again mixed using mechanical agitation until uniform. A summary of the coating composition is in Table 1 below.

TABLE 1

| Coating Composition | | |
| --- | --- | --- |
| | lb | wt % |
| Methyl Ethyl Ketone | 150 | 31.85 |
| Toluene | 130 | 27.6 |
| 1,1,1 Trichloroethane | 12 | 2.55 |
| Styrene/Maleic Anhydride [2625A Resin (Atochem Inc.)] | 35 | 7.43 |
| Polyvinyl Acetate [VINAC B-100 Resin (Air Products)] | 25 | 5.31 |
| Methyl Ethyl Ketone | 78 | 16.56 |
| 1,1,1 Trichloroethane Solvent | 40 | 8.49 |
| Dye[1] | 0.94 | 0.2 |
| Total Weight | 470.94 | |

[1]The dye can be, for example, Orazol red G dye or Orazol blue GN dye. Both dyes are available from Ciba Giegy Corp.

The coating composition contained 13±0.25 percent solids, which was determined by using an evaporation method. The coating composition had an estimated viscosity of about 16-18 seconds using a #2 Zahn Cup.

Figure 2:
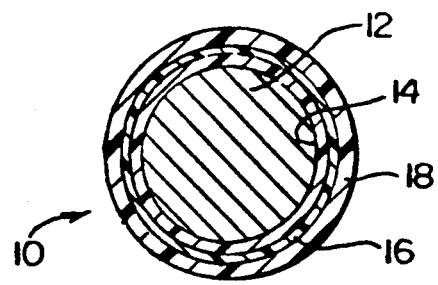
FIG. 2 is a cross-sectional view on a slightly larger scale, as taken along plane 2—2 of FIG. 1 in a direction indicated by arrows.

A coated nail 10, as shown in FIGS. 1 and 2, constitutes a preferred embodiment of this invention. The head 11 of the coated nail 10 is cupped, in a known manner, so as to provide a reservoir for a spackling compound applied over the coated nail 10.

The coated nail 10 has a metal body 12, which is made of carbon steel, preferably AISI C 1008 steel. Its metal surfaces are covered completely with an inner zinc layer 14, an intermediate chromate conversion layer 16, and an outer copolymer/thermoplastic resin coating 18.

The inner zinc layer 14, as applied by a known electroplating process, has a thickness of at least 0.5 mm so as to comply with Federal Building Code FF-N-105B, which is referenced to ASTM Specification A641, Class 1, Type 2. Preferably, as applied over the inner zinc layer 14 by a known chromating process, the chromate conversion layer 16 is a golden yellow (yellow irridescent) chromate conversion layer. A dark olive drab or dark black chromate conversion layer may be alternatively applied over the zinc layer 14, if desired.

As applied over the zinc and chromate conversion layers by the method disclosed herein, preferably within about two weeks after such layers are applied, the other copolymer/thermoplastic resin coating 18 has a thickness of about 0.2 mm to about 2 mm, preferably about 0.5 mm to 1.5 mm.

Figure 3:
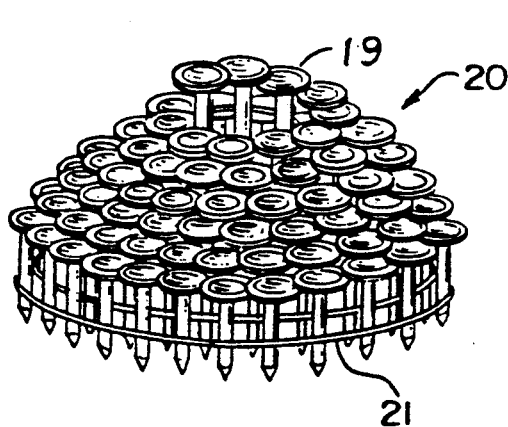
FIG. 3 is a simplified perspective view of a collated coil of nails.

As shown in FIG. 3, a plurality of coated nails 20, each of which is similar to the coated nail 10, are collated into a coil, to be coated generally as disclosed in Langas et al. U.S. Pat. No. 3,276,576. Each nail 20 has a cupped head 19 similar to the cupped head 11 of the coated nail 10.

The nails are situated in a rubber band 21 and formed into a coil 20. The metal surfaces of each coated nail 20 are covered completely with an inner zinc layer 14, as described above, and with an intermediate chromium conversion layer 16, as described above.

Figure 4:
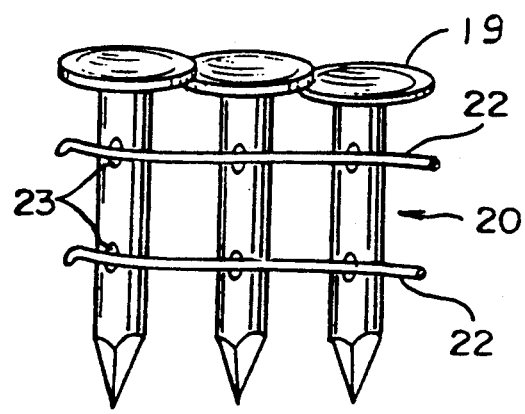
FIG. 4 is an elevational view on a slightly smaller scale, showing a fragmentary, collated strip of nails from the coil of FIG. 3 similar to the nail of FIG. 1.

FIG. 4 is a detailed view of a few coated nails in a coil which fits a magazine (not shown) of a fastener driving tool. The wires 22 are affixed to the coated nails 20 by welds 23. The zinc and chromate conversion layers are applied to each coated nail 20 before such coated nail 20 is situated between and welded to the wires 22.

Figure 5:
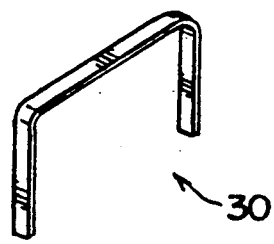
FIG. 5 is a perspective view of a staple constituting an alternative embodiment of this invention.

A coated staple 30, as shown in FIG. 5, constitutes yet another embodiment of this invention.

The coated staple 30 has a metal body, which is made of carbon steel, preferably AISI C 1008 steel. Its metal surfaces are covered completely with an inner zinc layer, as described above, an intermediate chromate conversion layer, as described above, and an outer, copolymer/thermoplastic resin coating, as described above.

The coated staple 30 may be one of a series (not shown) of similar staples that are collated. The outer coating on each of such staples, including the coated staple 30, may be advantageously used to collate the staples by applying the coating to the staples after the staples have been placed in a series, in side-to-side relation to one another.

Figure 6:
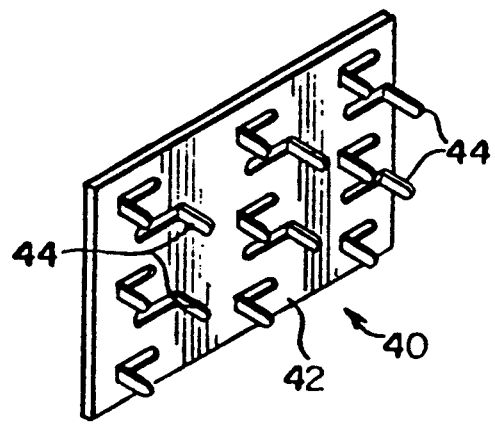
FIG. 6 is a simplified, perspective view of a truss plate constituting a further embodiment of this invention.

A coated truss plate 40, as shown in FIG. 6 constitutes yet another embodiment of this invention.

The coated truss plate 40 is formed from a planar member 42, from which a plurality of pointed teeth 44 are struck. The truss plate 40 usually is made of carbon steel, such as AISI C 1008 steel. Preferably, the truss plate 40 is covered in its entirety with an inner zinc layer, as described above, an intermediate chromium conversion layer, as described above, and an outer coating, as described above.

The coated truss plate 40 may be alternatively made from a galvanized, i.e., zinc-coated, steel sheet, which sheet has been galvanized in a hot-dip or other process. When the teeth 44 are struck from the planar member 42, the edges of the teeth 44 and the edges of the openings left in the planar member 42 by the teeth 44 are exposed without any zinc coating on the exposed edges. To provide corrosion protection for the exposed edges, the truss plate 40 may be then immersed in a phosphating bath so as to apply a phosphate coating on the exposed edges as well as on the other parts of the metal body. A zinc phosphate coating is preferred. An iron phosphate coating may be alternatively applied. Next, an intermediate chromate conversion layer, as described above, and an outer, coating, as described above, are applied to the truss plate 40 in its entirety. The intermediate chromium conversion layer may be optionally omitted.

Example 2

Preparation of a Coated Fastener

Nails made of AISI C 1008 steel are first cleaned in an alkaline earth metal bath, rinsed, pickled in an acidic bath, rinsed, galvanized, and rinsed again. The nails are galvanized so as to comply with ASTM Specification A641, Class 1, Type 2. Next, a chromate conversion layer is applied to the nails. Thereafter, the thus treated nails are rinsed and over-coated.

Nails which have been galvanized and chromated are preferred to be coated with the coating composition. It is envisioned that the composition can be applied to fasteners that have not been galvanized or chromated but upon which the properties imparted by the coating would be desirable.

The nails are collated into coils by means of the wires 22. The coils are dipped into bath of coating composition as described in Example 1 above, to provide a dry coat thickness of about 0.5 mm to about 1.5 mm. The coating composition has a viscosity of less than about 100 cps. The coating is dried in a circulating air atmosphere at about ambient temperature, preferably about 60° F. (15° C.) to 100° F. (38° C.)

Due to the manner in which the coating is applied to the nails, bridges of coating between the nails may form even though the coating composition has a low viscosity. These bridges of coating harden as the coating is dried. These bridges could be problematic if they were too rigid and therefor not easily broken. For example, a coated coil of nails that is placed in a magazine of a driving tool would be unsatisfactory if the coating bridges caused the nails to bind in the magazine. Also, if the bridges, when broken, removed portions of the coating on the fastener, the fastener would be less effective for its intended purpose.

Because the copolymer/thermoplastic resin coating is brittle when dried, the bridges that form during the coating process can be easily broken without damaging the coating on the fastener itself. The desired brittleness is provided by the styrene monomer in the copolymer.

The coated fastener has a demonstrated affinity for plaster and plaster-like materials. The nails are thus particularly suited for use in drywall or plasterboard applications to fasten the plasterboard to wooden frames. After the plasterboard is fastened, a plaster spackling compound is applied over the seams and the exposed nail heads to make a uniform surface. If the spackling compound does not adhere to the nail head it may be visible through the overcoat, or a pocked or otherwise uneven surface could result. The appearance of the resulting surface would be unacceptable. Because the coating composition of the present invention has a demonstrated affinity for plaster-like materials, the spackling compound or other plaster based overcoat adheres to the fastener head and the desired uniform overcoat appearance is obtained.

Various modifications may be made in the coating composition, coated metal fastener or method of coating without departing from the spirit and scope of the invention, as defined in the appended claims.

I claim:

1. A coating composition for metal fasteners comprising:
   a copolymer of an aromatic monomer and a monomer with $\alpha,\beta$ unsaturation with carboxyl groups, said $\alpha,\beta$ unsaturated monomer selected from the group consisting of maleic acid, fumaric acid and maleic anhydride;
   a thermoplastic synthetic resin adhesive;
   and an inert organic solvent selected from the group consisting of aromatic solvents, ketones, chlorohydrocarbons, and mixtures thereof.

2. The coating composition of claim 1 wherein the aromatic monomer is selected from the group consisting of styrene, vinyl toluene, $p$-methylstyrene, $\alpha$-methylstyrene, and divinyl benzene.

3. The coating composition of claim 2 wherein the monomer with $\alpha,\beta$ unsaturation is maleic anhydride.

4. The composition of claim 1 wherein the thermoplastic resin is polyvinyl acetate.

5. The coating composition of claim 3 wherein the aromatic monomer is styrene in a mole ratio of styrene monomer to maleic anhydride monomer of about 1 to 1 to about 3 to 1.

6. The coating composition of claim 1 wherein the ratio of the copolymer to the thermoplastic resin is about 20 to 80 to about 80 to 20 parts by weight.

7. The coating composition of claim 1 wherein the copolymer is present at about 4% to about 15% parts by weight of the coating composition.

8. The coating composition of claim 1 wherein the thermoplastic resin is present at about 3% to about 16% parts by weight of the coating composition.

9. The coating composition of claim 1 wherein the composition is about 70 percent to about 95 percent by weight organic solvent.

10. The composition of claim 1 wherein the aromatic solvent is toluene.

11. The composition of claim 1 wherein the ketone is methylethylketone.

12. The composition of claim 1 wherein the organic solvent is a mixture of toluene, methylethylketone and 1,1,1 trichloroethane.

13. The coating composition of claim 1 wherein the carboxyl groups of the monomer with $\alpha,\beta$ unsaturation are partially esterified.

14. A metal fastener that adheres to plaster with a polymeric coating, comprising:
    a copolymer of an aromatic monomer and a monomer with $\alpha,\beta$ unsaturation with carboxyl groups, said $\alpha,\beta$ unsaturated monomer being selected from the group consisting of maleic acid, maleic anhydride, and fumaric acid and a thermoplastic resin over substantially its entire metal surface and contiguous therewith.

15. The metal fastener of claim 14 wherein the aromatic monomer is styrene.

16. The metal fastener of claim 5 wherein the monomer with $\alpha,\beta$ unsaturation is maleic anhydride.

17. The metal fastener of claim 16 wherein the mole ratio of styrene monomer to maleic anhydride monomer in the copolymer is about 1 to about 1 to about 3 to about 1.

18. The metal fastener of claim 17 wherein the ratio of the first resin to the second resin is about 20 to 80 to about 80 to 20 parts by weight.

19. The metal fastener of claim 14 wherein the polymeric coating has a thickness in the range of about 0.2 to about 2 millimeters.

20. The metal fastener of claim 14 wherein the metal fastener is a nail.

21. The metal fastener of claim 14 wherein the metal fastener is a staple.

22. The metal fastener of claim 14 wherein the metal fastener is a truss plate.

* * * * *